Victor Bigand
Inventor

By Attorney H. R. Kerslake

UNITED STATES PATENT OFFICE.

VICTOR BIGAND, OF BUENOS AIRES, ARGENTINA.

GRAIN-DRYING APPARATUS.

1,364,477.  Specification of Letters Patent.  Patented Jan. 4, 1921.

Application filed November 3, 1919. Serial No. 335,272.

*To all whom it may concern:*

Be it known that I, VICTOR BIGAND, a citizen of the Argentine Republic, residing at Calle Maipú 671, Buenos Aires, Argentine Republic, have invented new and useful Improvements in Grain-Drying Apparatus, of which the following is a specification.

This invention relates to an improved apparatus particularly designed for aerating and drying grain of any kind, the novel apparatus possesses advantages over the apparatus adopted heretofore for that purpose.

It is well known, that the degree of dryness is a factor of much importance in storing grain during a long period of time, or for transporting the same, for without dryness the germinative properties of the grain will be impaired. As a matter of fact, no grain should be stored with a content of moisture exceeding 5 per cent. However, owing either to the want of suitable means or to the condition of the weather during bagging, grain is often bagged with a content of moisture exceeding 15 per cent. As a logical consequence of this practice, most of the cargoes arrive in bad conditions at their destination, causing more or less loss to all the parties interested in the business.

After effecting trials with a large number of different grain drying apparatus without obtaining satisfactory results, the primitive method is generally resorted to, which consists, as is well known, in spreading the grain during fine weather on watertight floors of cement or directly on the ground, previously covered with sack-cloth or other suitable fabric to prevent the grain from getting soiled.

This primitive method is rather expensive because of the time and labor thereby involved, as well as of the difficulties inherent to spreading, turning and collecting the grain on a large surface. Besides, the drying process is considerably retarded, where the grain is spread on the ground by the spontaneous evaporation of the moisture of the soil, in spite of the interposition of the sack cloth. On the other hand, in case of a sudden rainfall or a heavy storm, the grain cannot be quickly gathered and protected.

As will hereinafter be seen, the apparatus according to this invention, while possessing all of the advantages of the primitive method, including the aeration and spontaneous drying of the grain, allows drying within a period of time much shorter than that required heretofore. Besides, the improved apparatus permits of spreading and collecting the cereal within a short time, with the aid of a small number of workmen, the means for speedily gathering the grain being one of the essential features of this novel apparatus. Said apparatus substantially consists of a series of tiltable surfaces or floors which in conjunction constitute an extensive area destined to hold the grain under treatment, but which, at any desired moment may be caused to discharge the grain onto another floor or screen of a construction similar to that of the former, and the final floor discharges the grain into a collecting hopper.

The apparatus substantially comprises two or more superposed floors or screens, each of which is formed by tiltable sections so arranged that the grain spread on the uppermost of the floors or surfaces, may, at will, be made to fall onto the next following lower surface or floor, and from this latter onto a third floor or into a collecting hopper, provided with a discharge spout adapted to be obturated, for the purpose of facilitating the bagging operation. By this means, the grain contained on the uppermost floor may be well exposed to the sun and dried, whereafter the aeration and drying is continued and completed on the lower floor or floors, so that the grain may be collected in the hopper and bagged at a suitable degree of temperature.

For the better understanding of this specification, illustrative drawings have been annexed thereto in which.

Figure 1:
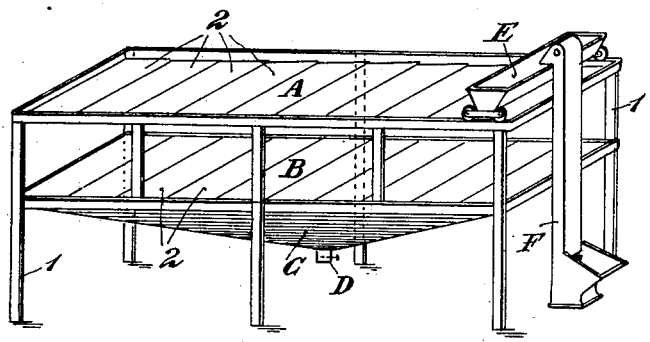
Figure 1 shows a perspective view of the grain drying apparatus, constructed in accordance with this invention.
Figure 2:
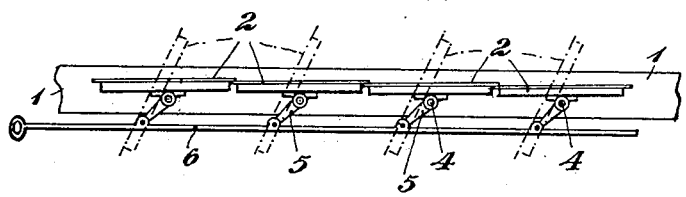
Fig. 2 is a detail view of the tiltable sections which constitute the drying floors or surfaces, the tilted position of said sections being indicated by dotted lines.
Figure 3:
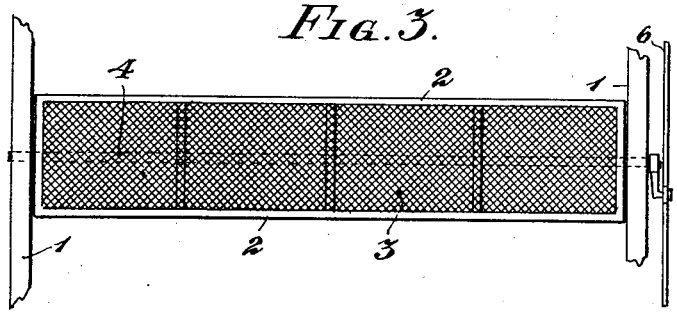
Fig. 3 shows a plan view of one of said sections.

In said drawings, 1 indicates a metallic frame on the upper part of which is suitably supported the drying surface or floor A, formed by a series of tiltable sections 2, comprising, as shown in Fig. 3, a frame covered with wire fabric 3 or any other suitable material, the frame being secured to a longitudinal axle 4 supported to turn in the side beams and which, when operated by the cranks 5 by means of a connecting rod 6, causes the frames to be moved to the position shown with dotted lines in Fig. 2.

The drying floor or surface B is formed by elements identical to those which form the upper floor. Below the floor B is arranged the collecting hopper C, the discharge spout D of which is provided with suitable means which allow of obturating the spout at will. If desired, a scale may be placed beneath the spout for determining the weight of each bag when filled. The operation of spreading the grain may be effected by hand, with the use of shovels, or above the surface or floor A a traveling spreading hopper F may be mounted on wheels, so as to enable the same to move along above the entire upper drying floor, for the purpose of evenly distributing the grain to be dried. The said spreading hopper may be charged by any suitable means, such as ordinary elevator F, operated by hand or by means of a suitable engine.

It will be understood that the dimensions of the apparatus as well as the number of the tiltable sections of the same and the construction thereof may be selected as deemed convenient, according to the size to be given to the apparatus.

The operation of drying the grain is performed in the following manner:

The grain to be dried is conveyed to the elevator which at turn discharges the same into the spreading hopper F which by traveling toward the opposite end of the apparatus, spreads an even layer of grain on the drying floor A, after which the hopper is filled with a fresh amount of grain.

The grain spread on the surface or floor A is submitted to the action of the rays of the sun and the air which passes through the meshes of the wire fabric or the holes of the perforate sheet forming said floor. After attaining the desired degree of dryness, the rod 6 is operated which by the means above described will cause the tiltable sections 2 to incline so that the grain supported thereby will slide onto the floor or surface B, where it is left to cool and dry. Then the tiltable sections of the upper floor A may be returned to their normal positions and a fresh layer of grain may be spread thereon. When the grain has become sufficiently dry, the grain on the floor B is discharged into the hopper C by inclining, as before, the tiltable sections of said floor, by the means above described. The tiltable sections of the drying floors A and B may be operated simultaneously or successively, in order to avoid too sudden a discharge.

The grain collected within the hopper C may readily be bagged and also weighed, if desired.

I now declare that what I claim as new and desire to secure by Letters Patent, is:

A grain drying apparatus including a skeleton frame provided with a plurality of superposed floors each of which consists of a series of perforated sections having their ends pivotally mounted in said frame, means for holding the sections of one floor in substantial alinement or for tilting said sections to cause material carried thereby to be dropped through the floor, a hopper arranged beneath the floors, receiving materials therefrom and provided at its bottom with a discharge chute having a closing means, an elevator provided at one end of said frame and designed to elevate grain to the upper one of said floors, and a hopper receiving grain from said elevator and provided with rollers engaging the top of said frame for moving said hopper over the upper floor sections to deposit grain upon said sections.

VICTOR BIGAND.

Witnesses:
A. FORIANO,
ROSINDO RANNER.